April 22, 1924.
G. WAHLSTEN
1,491,121
DRIVING WHEEL FOR LOCOMOTIVES
Filed Aug. 29, 1922
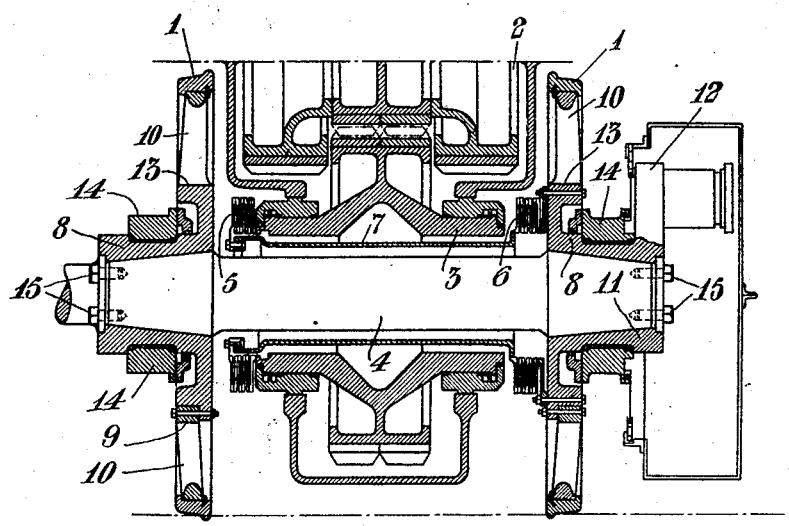
Inventor
G. Wahlsten,
By Marks & Clerk
Attys.

Patented Apr. 22, 1924.

1,491,121

UNITED STATES PATENT OFFICE.

GÖSTA WAHLSTEN, OF KVARTERET LONNEN, SKARSATRA, SWEDEN, ASSIGNOR TO AKTIEBOLAGET LJUNGSTRÖMS ANGTURBIN, OF STOCKHOLM, SWEDEN, A CORPORATION.

DRIVING WHEEL FOR LOCOMOTIVES.

Application filed August 29, 1922. Serial No. 585,052.

*To all whom it may concern:*

Be it known that I, GÖSTA WAHLSTEN, a subject of the King of Sweden, residing at Kvarteret Lonnen, Skarsatra, Sweden, have invented certain new and useful Improvements in Driving Wheels for Locomotives, of which the following is a specification.

In locomotives and similar carriages it has previously been proposed to use driving wheels which are shrunk or pressed onto the driving wheel shafts together with or separated from the corresponding crank. In case of the driving wheel shaft being journaled inside the driving wheel, the latter has generally at any point of the spokes the shape of a crank pin. In embodiments where the driving wheel shaft is journaled outside the driving wheel the latter is generally shrunk or pressed onto the driving wheel shaft which at the ends is provided with cranks either by the crank being shrunk or pressed onto the driving wheel shaft or by means of screw-bolts and the like connected with the same. In all said constructions it has proved difficult to place the cranks in correct angular position in relation to each other and in certain cases such constructions have been an obstacle to the provision of power transmission between the driving mechanism of the locomotive and the driving wheels in case of the power transmitting device consisting of a toothed gearing.

This invention relates to a driving wheel having a crank, the wheel being adapted to be advantageously mounted and dismounted and particularly useful in locomotives having mechanical power transmission directly to the first driving wheel shaft of the locomotive. The invention is chiefly characterized by the hub of the driving wheel being extended axially and formed as a crank integral with the hub by being preferably cast together with the same.

The accompanying drawing illustrates two embodiments of the invention, the upper part of the figure showing the one embodiment and the lower part the other one. In this case the driving wheel 1 is combined with a toothed gearing 2 the slowest rotating shaft 3 of which is located around the driving wheel shaft 4 and in known manner by means of diaphragm-couplings 5 and 6 transmitting the power through the sleeve 7 to the driving wheel shaft.

In the embodiment shown in the lower part of the figure the wheels are dividable, the hub 8 being separable from the part 9 supporting the spokes 10 of the wheel. The spokes 10 of the driving wheel shown in the upper part of the figure are integral with the hub 8. In both embodiments the hub 8 is, according to the invention, provided with an axial extension 11 formed as a crank 12. The driving wheel 1 together with the driving shaft 4 is journaled in the bearing 14 between the crank 12 and the part 13 of the hub. The whole driving wheel or, in case of the same being divided, only the hub of the same may either be shrunk, pressed onto or, as shown in the drawing, fastened to the shaft 4 by means of bolts. The driving wheel may be dismounted by unscrewing the bolts 15 and then the driving wheel may be removed from the shaft. This dismounting is necessary, especially in case of the gearing having the construction shown in the drawing, since the diaphragms placed inside the driving wheels should be slid axially onto the driving shaft.

What I claim as new and desire to secure by Letters Patent of the United States is:—

1. Driving wheel for locomotives and the like, the hub of the wheel being provided with an axial extension and formed as a crank, the extension and the crank being integral with the hub.

2. Driving wheel for locomotives and the like, the hub of the wheel being provided with an axial extension and formed as a crank, the spokes, the hub, the extension and the crank being made in one piece.

3. Driving wheel for locomotives and the like, the hub of the wheel being provided with an axial extension and formed as a crank, the extension and the crank being integral with the hub, and the extension being formed between the driving wheel proper and the crank as a bearing for the wheel.

In testimony whereof I affix my signature in presence of two witnesses.

GÖSTA WAHLSTEN.

Witnesses:
SNEZ SWENORN,
TERT FALK.